United States Patent [19]

Wada

[11] Patent Number: 5,212,819
[45] Date of Patent: May 18, 1993

[54] LIQUID CRYSTAL DISPLAY DEVICE WITH PARTICULAR ANGLE BETWEEN OPTICAL AXIS OF OPTICALLY ANISOTROPIC MATERIAL AND OBSERVATION DIRECTION

[75] Inventor: Hiroshi Wada, Suwa, Japan

[73] Assignee: Seiko Epson Corporation, Tokyo, Japan

[21] Appl. No.: 683,419

[22] Filed: Apr. 9, 1991

[30] Foreign Application Priority Data

Apr. 9, 1990 [JP] Japan .................... 2-93667

[51] Int. Cl.$^5$ .................... G02F 1/13; G02F 1/1335
[52] U.S. Cl. .................... 359/63; 359/73; 359/102
[58] Field of Search .......... 350/347 R, 337; 359/63, 359/73, 102

[56] References Cited

U.S. PATENT DOCUMENTS

| | | | |
|---|---|---|---|
| 4,844,569 | 7/1989 | Wada et al. | 350/347 R |
| 4,852,976 | 8/1989 | Suzuki | 350/337 |
| 4,889,412 | 12/1989 | Clerc et al. | 359/73 |
| 4,909,606 | 3/1990 | Wada et al. | 350/347 R |
| 4,957,349 | 9/1990 | Clerc et al. | 359/73 |
| 5,016,988 | 5/1991 | Iimura | 350/337 |

FOREIGN PATENT DOCUMENTS

| | | |
|---|---|---|
| 297841 | 4/1989 | European Pat. Off. |
| 0350063 | 1/1990 | European Pat. Off. |
| 0350075 | 1/1990 | European Pat. Off. |
| 0352724 | 1/1990 | European Pat. Off. |
| 2580105 | 10/1986 | France .......... 350/337 |
| 123944 | 10/1978 | Japan . |

OTHER PUBLICATIONS

Ohgawara et al., "A Color STN Display with Two Retardation Compensating Films", 1989 SID International Symposium, Digest of Technical Papers, First Edition, May, 1989, pp. 390-392.

Primary Examiner—William L. Sikes
Assistant Examiner—Anita Pellman Gross
Attorney, Agent, or Firm—Kaplan Blum

[57] ABSTRACT

A super twisted nematic liquid crystal display device includes a liquid crystal cell, upper and lower polarizing plates, and at least one phase difference plate between the polarizing plates. The angle between the direction of the optical axis of the phase difference plate and the observation direction of the device is set between about 0°-30° or 60°-90°.

15 Claims, 7 Drawing Sheets

LIQUID CRYSTAL DISPLAY DEVICE WITH PARTICULAR ANGLE BETWEEN OPTICAL AXIS OF OPTICALLY ANISOTROPIC MATERIAL AND OBSERVATION DIRECTION

BACKGROUND OF THE INVENTION

This invention relates generally to a liquid crystal display device, and more particularly, to a liquid crystal display device having improved viewing angle and improved black and white display contrast.

Super twisted nematic (STN) liquid crystal display devices including a uniaxial anisotropic member (an oriented high molecular weight polymer sheet) between the polarizers of the device have been proposed to improve the display contrast. An example of such a liquid crystal display device 10 with a uniaxial optically anisotropic member 12 is shown in FIG. 1. Device 10 includes a twisted nematic liquid crystal display cell 13 with an upper linear polarizer 11 and a lower polarizer 14 on the outer surfaces of cell 13 and optically anisotropic layer 12. Display cell 13 includes an upper substrate 15 and lower substrate 16 with transparent electrodes 17 and 18 disposed on the inner surfaces and a twisted nematic liquid crystal material 19 therebetween. A spacer 22 holds substrates 15 and 16 apart and liquid crystal material 19 therebetween. Liquid crystal material 19 is twist oriented by rubbing the interior surfaces of substrates 15 and 16.

FIG. 2 shows the relationship between the axes of these elements. In FIG. 2, R15 and R16 designate the rubbing directions of upper substrate 15 and lower substrate 16. Angle T4 designates the direction and angle of twist of the liquid crystal molecules in material 19 from upper substrate 15 to lower substrate 16. P11 and P12 designate the directions of the axes of polarization of upper polarizer 11 and lower polarizer 12, respectfully. A line A—A' identifies the direction of observation of device 10. $\Theta_{45}$ is the angle between direction of observation A—A' and rubbing direction R15 of upper substrate 15 and $\Theta_{46}$ is the angle between direction of observation A—A' and rubbing direction R16 of lower substrate 16. $\Theta_{45}$ and $\Theta_{46}$ are approximately equal to each other. Device 10 is described in detail in applicant's U.S. Pat. No. 4,844,569, the contents of which are incorporated herein by reference.

In device 10, the retardation value of optically anisotropic member 12 and the relationship between the axes are set for use in an STN display mode in order to improve the contrast and allow for a black-and-white display. While this arrangement has improved contrast and achieved nearly a full black and white display compared to ordinary STN devices, viewing angle characteristics were not considered.

Accordingly, it is desirable to provide a liquid crystal display device which has improved viewing angle characteristics as well as excellent black and white hues in the display.

SUMMARY OF THE INVENTION

Generally speaking, in accordance with the invention, a liquid crystal display device includes a twisted nematic liquid crystal display cell and at least one optically anisotropic member disposed between a pair of polarizing plates disposed on opposite sides thereof and a twisted nematic liquid crystal material disposed in the liquid crystal cell. The direction of the optical axis of the optically anisotropic substance layer is at a predetermined angle from the usual direction of observation of the display device. Preferably, this angle is between about 0° and 30° or between about 60° and 90°.

Accordingly, it is an object of the invention to provide an improved liquid crystal display device having improved view angle characteristics.

Another object of the invention to provide a liquid crystal display device with an anisotropic layer between the polarizers of the device.

A further object of the invention is to provide a liquid crystal display device having true shades of black and white in the display.

Yet another object of the invention is to provide a super twisted liquid crystal display device having improved viewing angle characteristics.

Still other objects and advantages of the invention will, in part, be obvious and will, in part, be apparent from the specification.

The invention accordingly comprises the article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 3:
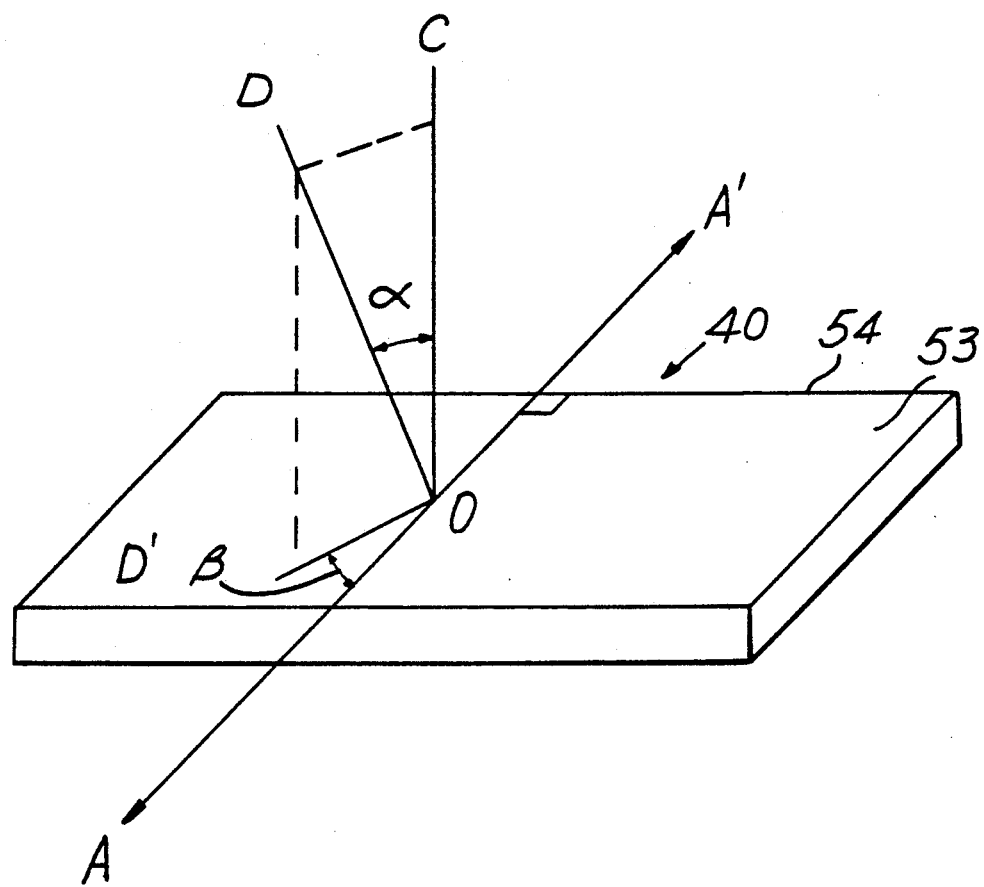
FIG. 3 diagrammatically illustrates the normal direction of observation.

As used herein, the direction of observation is defined with reference to FIG. 3. The direction of observation is the projection in the plane of the display screen 53 of the direction from which the display screen is viewed most frequently during use of the liquid crystal display 40. Ordinarily, it coincides with the direction A—A' perpendicular to the lengthwise direction and rear edge 54 of the rectangular display 40. In other words, the observation direction as used herein is the direction in the plane of the liquid crystal screen 53 that extends from the user to the device 40 along which a projection in said plane of the user's most frequent line of sight would lie. As used herein and as shown in FIG. 3, α designates the viewing angle between the direction OC perpendicular to the plane of the display screen and the direction of viewing OD, and β designates the projected viewing angle between the direction of observation and the direction projected of viewing OD' on the plane of display screen 53.

It was desired to achieve display viewing angle characteristics such that the viewing angles on the front left side and front right side with respect to the direction of observation are approximately equal to each other, and that the ranges of viewing angles are generally uniform in the horizontal direction. An examination was made as to the effect on viewing angle characteristics of the directions of the polarization axes of the polarizing plates, the directions of axes including the rubbing directions of the liquid crystal cell, and the angles between the axes. This examination was made by using equal-contrast curves (the relationship between values of angles α and β shown in FIG. 3 at which a certain contrast is obtained). It was found that the direction of the center line on which equal-contrast curves are generally symmetric approximately coincides with the direction of the optical axis of the optically anisotropic member.

To achieve improved viewing angle characteristics in the liquid crystal display device in accordance with the invention, the angle between the observation direction A—A' and the direction of the optical axis of the phase difference plate is preferably between about 0°-30° or 60°-90°.

Figure 1:
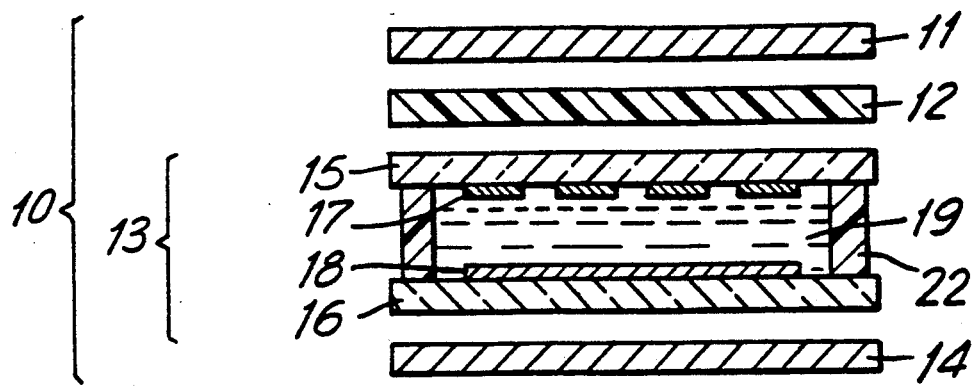
FIG. 1 is a cross-sectional view of a liquid crystal display device constructed and arranged in accordance with the prior art.
Figure 4:
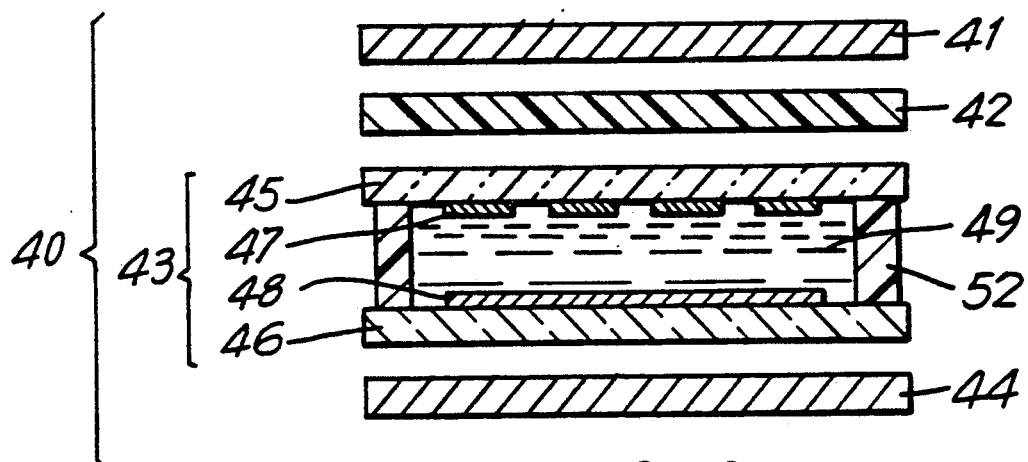
FIG. 4 is a cross-sectional view of a liquid crystal display device constructed and arranged in accordance with a first embodiment of the invention.
Figure 2:
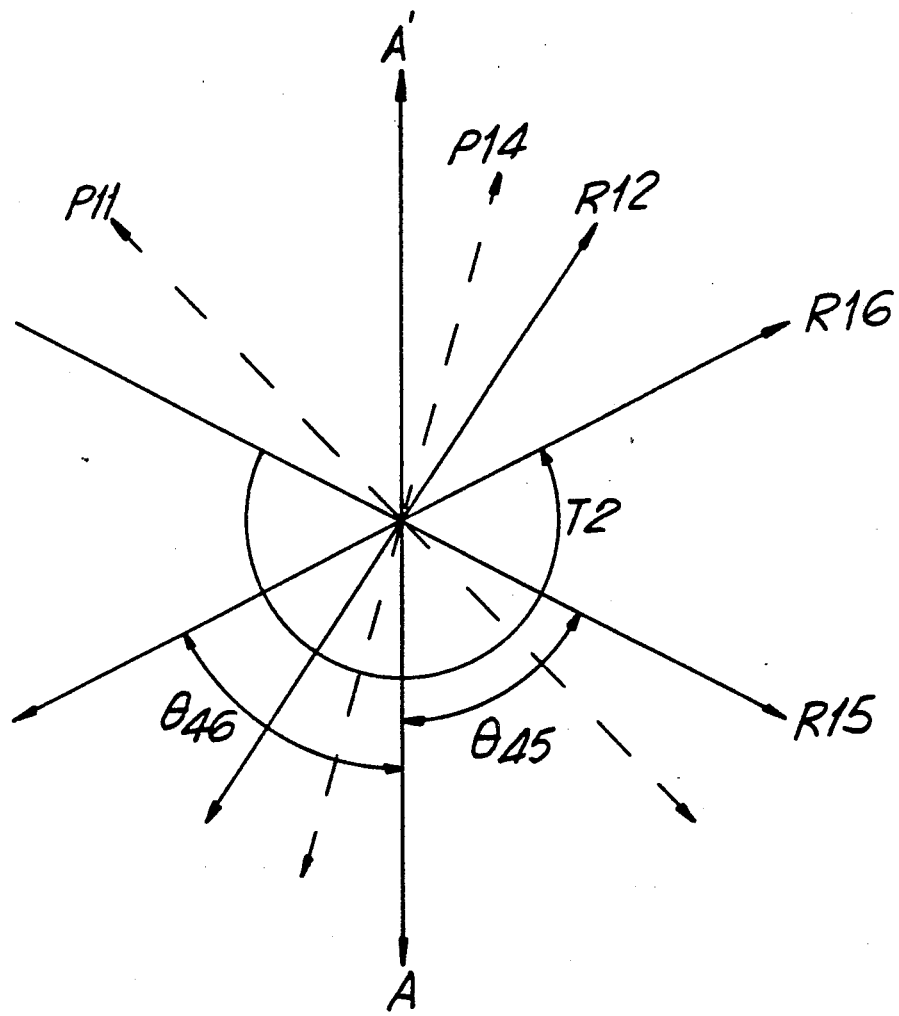
FIG. 2 diagrammatically illustrates the axes of the elements of the device of FIG. 1.

A liquid crystal display device 40 constructed and arranged in accordance with the invention is shown in FIG. 4. Device 40 includes a liquid crystal display cell 43 and a phase difference plate 42 disposed between an upper linear polarizer 41 and a lower polarizer 44. Phase difference plate 42 is a uniaxially-oriented polycarbonate member used as an optically anisotropic layer.

Phase difference plate 42 need not be limited to uniaxially-oriented polycarbonate. For instance, phase difference plate 42 may be formed by uniaxially stretching a material selected from, but not limited to, monomers or polymers of diacetyl cellulose, polyamide, polyimide, polyether sulfone, polysulfone, polyolefin, polyethylene, polyethylene terephthalate, polyvinyl alcohol, acryl, and polymethyl methacrylate.

FIG. 4 schematically shows a cross-sectional view of the structure of twisted nematic liquid crystal device 40 having a single layer 42 of an optically anisotropic substance. A liquid crystal cell 43 and layer 42 are disposed between an upper polarizer 41 and a lower polarizer 44. Cell 43 includes a twisted nematic liquid crystal material 49 disposed between an upper substrate 45 and lower substrate 46 with transparent electrodes 47 and 48 disposed on the interior surfaces, respectively.

Nematic liquid crystal material 49 is twist-oriented by rubbing the interior surfaces of substrates 45 and 46. Although liquid crystal material 49 can be oriented other than by rubbing, for convenience of description the direction in which the major axes of liquid crystal material 49 adjacent to substrates 45 and 46 will hereinafter be referred to as "rubbing direction". Spacer 52 serves to hold substrates 45 and 46 apart and retains liquid crystal material 49 in cell 43. Spacing maintaining members such as glass fibers or glass balls may be dispersed between substrates 45 and 46 to maintain the thickness of liquid crystal material 49.

Figure 5:
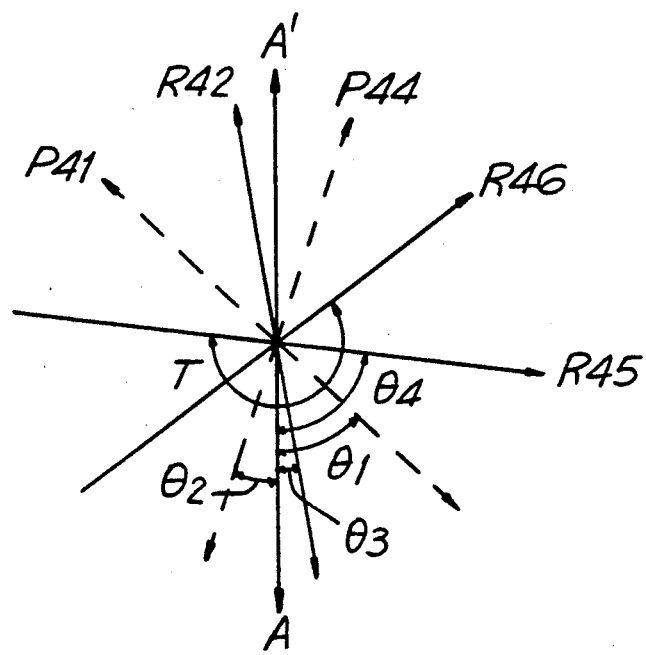
FIG. 5 diagrammatically illustrates the axes of the elements of the device of FIG. 4.

The relationship between the axes of polarizers 41 and 44, phase difference plate 42 and cell 43 are shown in FIG. 5. The rubbing directions of upper substrate 45, lower substrate 46 and phase difference plate 42 are denoted by R45, R46 and R42, respectively. The polarizing axes (absorption axes) of linear polarizers 41 and 44 are denoted by P41 and P44, respectively. Line A—A' represents the normal or usual direction of observation of device 40.

The direction and angle of twisting of liquid crystal material 49 in liquid crystal cell 43 as viewed in FIG. 4 from above to below is designated as T. $\Theta_1$ is the angle between observation direction A—A' and direction P41 of the polarization axis of upper polarizing plate 41; $\Theta_2$ is the angle between the observation direction A—A' and direction P44 of the polarization axis of lower polarizing plate 44; $\Theta_3$ is the angle between the observation direction A—A' and the direction R42 of the optical axis of the phase difference plate 42; and $\Theta_4$ is the angle between the observation direction A—A' and the rubbing direction R45 of upper substrate 45. The values of angles $\Theta_1$ through $\Theta_4$ are positive when measured clockwise from the observation direction A—A'.

This embodiment illustrated in FIGS. 4 and 5 will be described with respect to a negative display mode and the orientation of the polarization axes illustrated. In this mode the screen is dark when no voltage is applied and bright when a voltage is applied. However, it is observed that the same benefits of the invention can be obtained for other orientations as in a positive display mode. In this positive display mode the screen is bright when no voltage is applied, or dark when a voltage is applied. The refractive index anisotropy Δn of phase difference plate 42 is defined as Δnf, and the thickness of plate 42 is defined as df.

Figure 6:
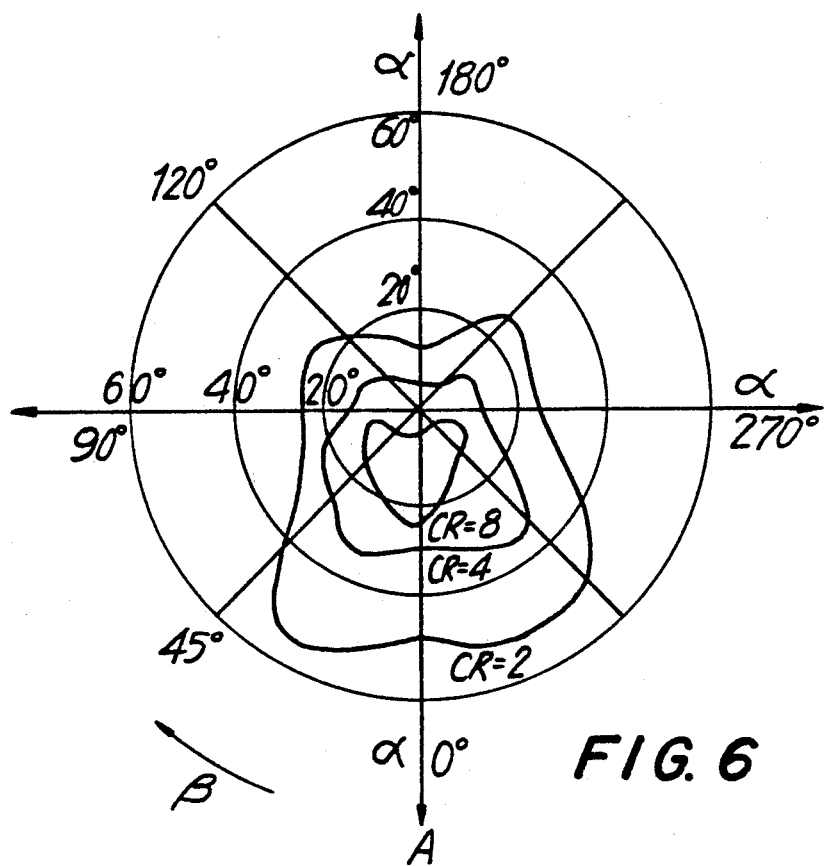
FIG. 6 diagrammatically illustrates equal contrast curves for the device of FIG. 3.

When a structure as shown in FIG. 4 has the product Δn·d of the refractive index anisotropy Δn of liquid crystal material 49 and a liquid crystal layer thickness of 0.9 μm, liquid crystal 49 is twisted by angle T of 240°; the product Δnf·df of the refractive index anisotropy Δnf and the thickness df of phase difference plate 42 is 0.55 μm, $\Theta_1 = -45°$, $\Theta_3 = -15°$, $\Theta_3 = 0°$ and $\Theta_4 = 90°$. Equal-contrast curves such as those shown in FIG. 6 are obtained. These curves are symmetric with respect to normal observation direction A—A' of device 40 and device 40 is easy to view under these conditions.

The parameters defined above are set forth in Table 1, Examples 1-10 and Comparative Examples 1-3. The resulting display contrast, dependent on whether the contrast curves were generally symmetrical with respect to the direction of observation, is also set forth. The symbols ⊚, ○, and x are used to indicate whether the display is very easy to see (⊚), good (○), or poor (x).

TABLE 1

| | Twisting Angle T | Δn · d of liquid crystal | Δnf · df of phase difference plate | $\Theta_1$ | $\Theta_2$ | $\Theta_3$ | $\Theta_4$ | Contrast symmetry |
| --- | --- | --- | --- | --- | --- | --- | --- | --- |

Examples of

TABLE 1-continued

| | Twisting Angle T | $\Delta n \cdot d$ of liquid crystal | $\Delta nf \cdot df$ of phase difference plate | $\Theta_1$ | $\Theta_2$ | $\Theta_3$ | $\Theta_4$ | Contrast symmetry |
|---|---|---|---|---|---|---|---|---|
| the invention | | | | | | | | |
| 1 | 240° left | 0.90 μm | 0.55 μm | −45° | −15° | 0° | 90° | ◉ |
| 2 | ↑ | ↑ | ↑ | −30° | 0° | 15° | −75° | ◉ |
| 3 | ↑ | ↑ | ↑ | −15° | 15° | 30° | −60° | ○ |
| 4 | ↑ | ↑ | ↑ | −75° | −45° | −30° | 60° | ○ |
| 5 | ↑ | 0.85 μm | 0.60 μm | −45° | −15° | 0° | 80° | ◉ |
| 6 | ↑ | ↑ | ↑ | −40° | −15° | 10° | 90° | ◉ |
| 7 | ↑ | 0.80 μm | 0.55 μm | −45° | −15° | 0° | 90° | ◉ |
| 8 | 180° left | 0.85 μm | 0.55 μm | −45° | −40° | 0° | 90° | ◉ |
| 9 | 230° left | 0.85 μm | 0.55 μm | −50° | −5° | 0° | 75° | ◉ |
| 10 | ↑ | ↑ | ↑ | −70° | −25° | −20° | 55° | ○ |
| Comparative examples | | | | | | | | |
| 1 | 240° left | 0.90 μm | 0.55 μm | −10° | 20° | 35° | −55° | X |
| 2 | ↑ | ↑ | ↑ | −80° | −40° | −35° | 55° | X |
| 3 | 230° left | 0.85 μm | 0.55 μm | −85° | −40° | −35° | 40° | X |

As can be seen from Table 1, when the angle between the direction of the optical axis of the phase difference plate and the direction of observation is between about 0° and 30°, a display is obtained which is easy to see and in which the contrast distribution is generally symmetric with respect to the direction of observation.

Examples 11 to 20 are display devices in which the axis of symmetry is more perpendicular to the direction of observation. The results of Examples 11 to 20, as well as Comparative Examples 4 to 6, are shown in Table 2 below. The symbols ◉, ○, and x are used to indicate whether the contrast curves are generally symmetrical with respect to a centerline perpendicular to the direction of observation. ◉ indicates that the result is very good, ○ indicates good, and x indicates poor.

symmetric with respect to a line perpendicular to the direction of observation.

Figure 7:
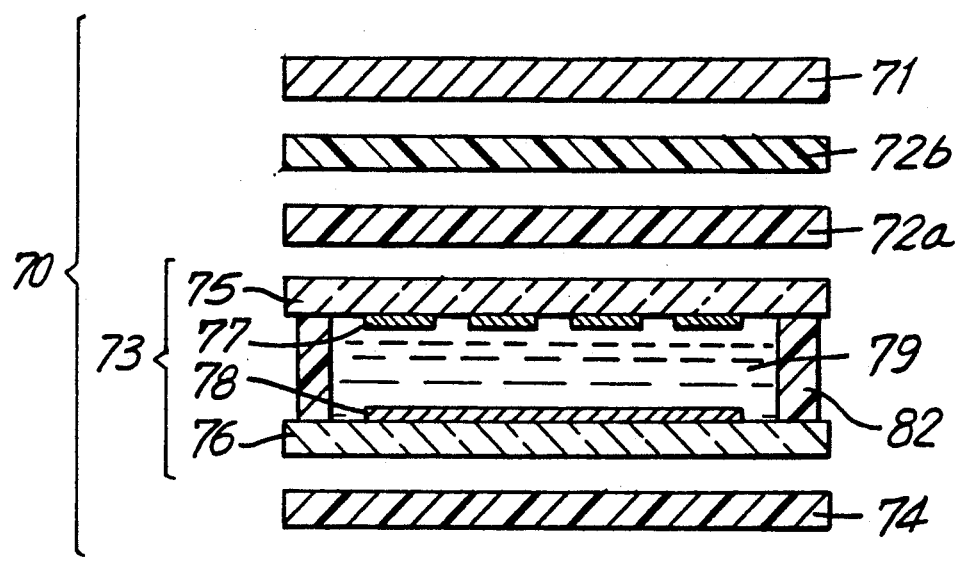
FIG. 7 is a cross-sectional view of a liquid crystal display device construed and arranged in accordance with a second embodiment of the invention.

A liquid crystal display device 70 constructed and arranged in accordance with a second embodiment of the invention is shown in FIG. 7. Device 70 includes a twisted nematic liquid crystal cell 33 and two phase difference plates 72a and 72b. Phase difference plate 72a is adjacent liquid crystal cell 73 while phase difference plate 72b is adjacent upper linear polarizer 71. Cell 73 includes a twisted nematic liquid crystal material 79 disposed between an upper substrate 75 and lower substrate 76 with transparent electrodes 77 and 78 disposed on the inner surfaces thereof. A spacer 82 holds substrates 75 and 76 apart and retains liquid crystal material 79 in the cell.

TABLE 2

| | Twisting Angle T | $\Delta n \cdot d$ of liquid crystal | $\Delta nf \cdot df$ of phase difference plate | $\Theta_1$ | $\Theta_2$ | $\Theta_3$ | $\Theta_4$ | Contrast symmetry |
|---|---|---|---|---|---|---|---|---|
| Examples of the invention | | | | | | | | |
| 11 | 240° left | 0.90 μm | 0.55 μm | 45° | 75° | 90° | 0° | ◉ |
| 12 | ↑ | ↑ | ↑ | 60° | 90° | −75° | 15° | ◉ |
| 13 | ↑ | ↑ | ↑ | 75° | 15° | −60° | 30° | ○ |
| 14 | ↑ | ↑ | ↑ | 15° | 45° | 60° | −30° | ○ |
| 15 | ↑ | 0.85 μm | 0.60 μm | 45° | 75° | 90° | −10° | ◉ |
| 16 | ↑ | ↑ | ↑ | 50° | 75° | −80° | 0° | ◉ |
| 17 | ↑ | 0.80 μm | 0.55 μm | 45° | 75° | 90° | 0° | ◉ |
| 18 | 180° left | 0.85 μm | 0.55 μm | 45° | −50° | 90° | 0° | ◉ |
| 19 | 230° left | 0.85 μm | 0.55 μm | 40° | 85° | 90° | −15° | ◉ |
| 20 | ↑ | ↑ | ↑ | 20° | 75° | 70° | −35° | ○ |
| Comparative examples | | | | | | | | |
| 4 | 240° left | 0.90 μm | 0.55 μm | 80° | −20° | −55° | −35° | X |
| 5 | ↑ | ↑ | ↑ | 10° | 50° | 55° | −35° | X |
| 6 | 230° left | 0.85 μm | 0.55 μm | 5° | 40° | 55° | −50° | X |

Figure 8:
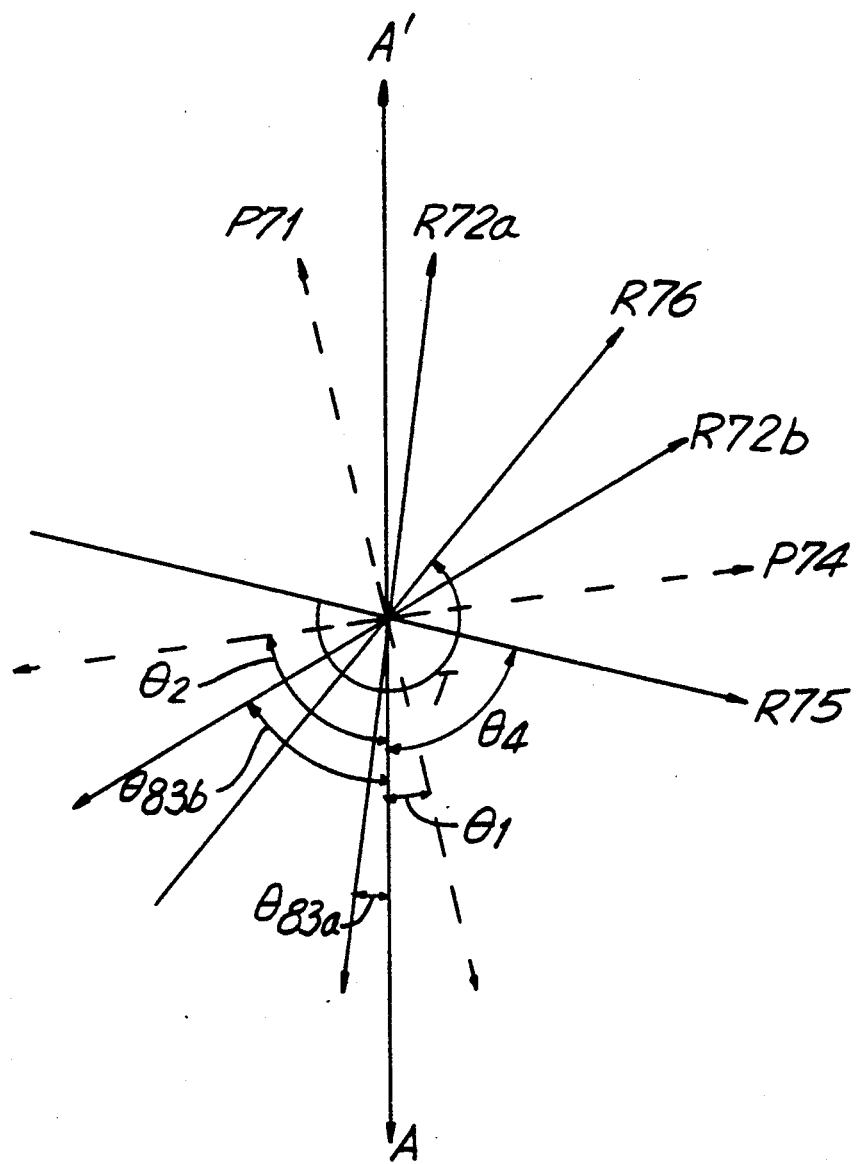
FIG. 8 diagrammatically illustrates the axes of the elements of the device of FIG. 7.

As can be seen from Table 2, when the angle between the direction of the optical axis of the phase difference plate and the direction of observation is between about 60° and 90°, a display is obtained which is also easy to see and in which the contrast distribution is generally The optical relationships between the axes of polarizers 71 and 74, phase difference plates 72a and 72b, and liquid crystal cell 73 are shown in FIG. 8. The rubbing directions of upper substrate 75, lower substrate 76, and phase difference plates 72 and 72b are denoted by R75, R76, R72a and R72, respectively. The polarizing axes (absorption axes) of linear polarizers 71 and 74 are denoted by P71 and P74, respectively. Line A—A' represents the direction of observation.

The direction and angle of twisting of liquid crystal material 79 in liquid crystal cell 73 as viewed in FIG. 7 from above to below is designated as T. The angle between the observation direction A—A' and direction P71 of the polarization axis of upper polarizing plate 77 is designated as $\Theta_1$. Similarly, the angle between the observation direction A—A' and direction P74 of the polarization axis of lower polarizing plate 74 is designated as $\Theta_2$. The angle between the observation direction A—A' and the direction R72a of the optical axis of the phase difference plate 72a is designated $\Theta_{83a}$. Similarly, the angle between the observation direction A—A' and the direction R72b of the optical axis of the phase difference plate 72b is designated $\Theta_{83b}$. The angle between the observation direction A—A' and the rubbing direction R75 of upper substrate 75 is designated as $\Theta_4$.

A liquid crystal display device was assembled having the construction of device 70 with the following parameters:

1. liquid crystal material 79 has a counterclockwise twisting angle of T=240°;
2. $\Delta n \cdot d = 0.90$ μm;
3. $\Delta nf \cdot df$ for phase difference plate 72a is 0.40 μm;
4. $\Delta nf \cdot df$ for phase difference plate 72b is 0.45 μm;
5. $\Theta_1 = -20°$;
6. $\Theta_2 = 70°$;
7. $\Theta_{83a} = 0°$;
8. $\Theta_{83b} = 50°$; and
9. $\Theta_4 = -80°$.

The parameters for Example 21 are set forth in Table 3 below, as are the parameters for a further Example 22.

ence plate 92a is between liquid crystal cell 93 and upper linear polarizer 91 and phase difference plate 92b is between liquid crystal cell 93 and lower linear polarizer 94. Cell 93 includes a twisted nematic liquid crystal material 99 disposed between an upper substrate 95 and lower substrate 96 with transparent electrodes 97 and 98 disposed on the inner surfaces thereof. Spacer 102 holds substrates 95 and 96 apart and retains liquid crystal material 99 therebetween.

Figure 10:
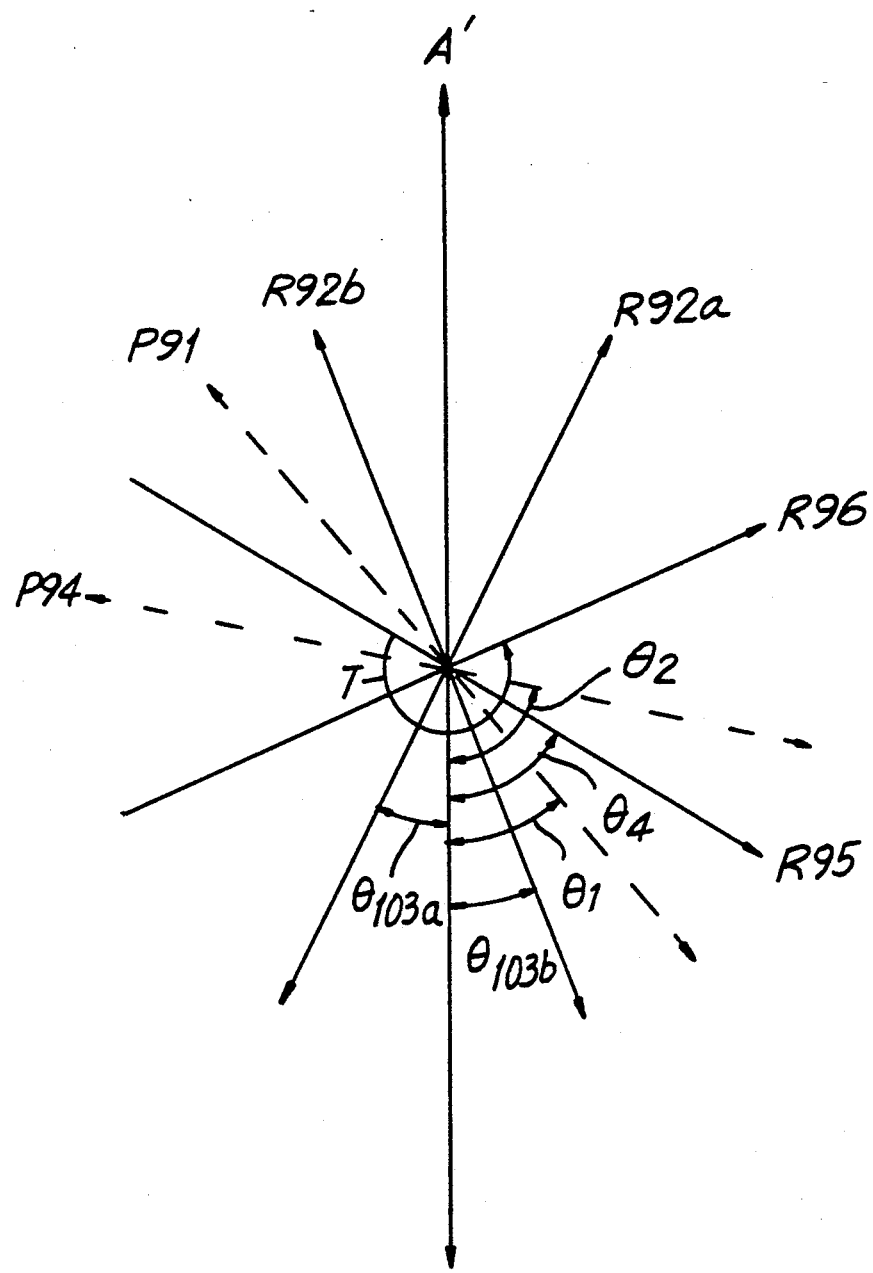
FIG. 10 diagrammatically illustrates the axes of the elements of the device of FIG. 9.

The optical relationships of the axes of polarizers 91 and 94, phase difference plates 92a and 92b, and cell 93 are shown in FIG. 10. The rubbing directions of upper substrate 95, lower substrate 96, and phase difference plates 92 and 92b are denoted by R95, R96, R92a and R92, respectively. The polarizing axes (absorption axes) of linear polarizers 91 and 94 are denoted by P91 and P94, respectively. Line A—A' represents the direction of observation.

The direction and angle of twisting of liquid crystal material 99 in liquid crystal cell 93 as viewed in FIG. 9 from above to below is designated as T. $\Theta_1$ is the angle between observation direction A—A' and direction P91 of the polarization axis of upper polarizing plate 91. Similarly, $\Theta_2$ is the angle between observation direction A—A' and direction P94 of the polarization axis of lower polarizing plate 94. $\Theta_{103a}$ is the angle between observation direction A—A' and the direction R92a of the optical axis of the phase difference plate 92a. Similarly, $\Theta_{103b}$ is the angle between observation direction A—A' and direction R92b of the optical axis of phase difference plate 92b. $\Theta_4$ is the angle between observation direction A—A' and the rubbing direction R95 of upper substrate 95.

A liquid crystal display device having the construction of device 90 was assembled with the following parameters:

1. liquid crystal material 99 has a counterclockwise twisting angle of T=240°;
2. $\Delta n \cdot d = 0.90$ μm;

TABLE 3

| Examples | Twisting Angle T | $\Delta n \cdot d$ of liquid crystal | $\Delta nf \cdot df$ of phase difference plate 73a | $\Delta nf \cdot df$ of phase difference plate 73b | $\Theta_1$ | $\Theta_2$ | $\Theta_{83a}$ | $\Theta_{83b}$ | $\Theta_4$ | Contrast symmetry |
|---|---|---|---|---|---|---|---|---|---|---|
| 21 | 240° left | 0.90 μm | 0.40 μm | 0.45 μm | −20° | 70° | 0° | 50° | −80° | ◉ |
| 22 | 240° left | 0.90 μm | 0.42 μm | 0.42 μm | 0° | 90° | 30° | 70° | −70° | ○ |

The equal-contrast curves of Examples 21 and 22 are symmetric with respect to the direction of the liquid crystal cell, and the display is easy see under these conditions. However, the degree of symmetry of equal-contrast curves is slightly lower in Example 22 than in Example 21.

Figure 9:
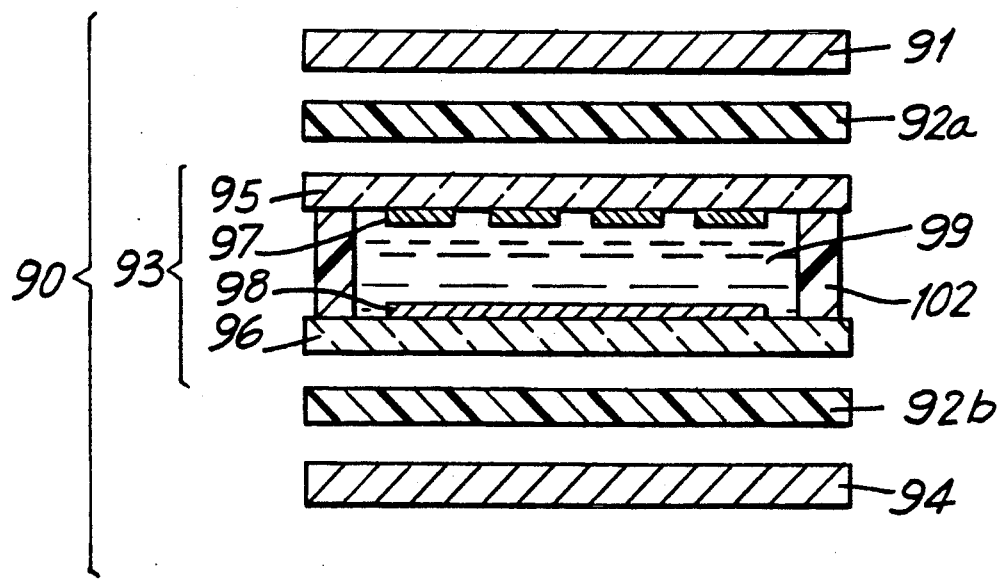
FIG. 9 is a cross-sectional view of a liquid crystal display device constructed and arranged in accordance with a third embodiment of the invention.

A liquid crystal display device 90 constructed and arranged in accordance with a third embodiment of the invention is shown in FIG. 9. Device 90 includes twisted nematic liquid crystal cell 93 disposed between two phase difference plates 92a and 92b. Phase differ- 3. $\Delta nf \cdot df$ of phase difference plate 92a is 0.42 μm;
4. $\Delta nf \cdot df$ of phase difference plate 92b is 0.42 μm;
5. $\Theta_1 = -10°$;
6. $\Theta_2 = -80°$;
7. $\Theta_{103a} = 30°$;
8. $\Theta_{103b} = -30°$; and
9. $\Theta_4 = -60°$.

The parameters defined above for Example 23 are set forth in Table 4 below, as are the parameters for a further Example 24.

TABLE 4

| Examples | Twisting Angle T | $\Delta n \cdot d$ of liquid crystal | $\Delta nf \cdot df$ of phase difference plate 103a | $\Delta nf \cdot df$ of phase difference plate 103b | $\Theta_1$ | $\Theta_2$ | $\Theta_{103a}$ | $\Theta_{103b}$ | $\Theta_4$ | Contrast symmetry |
|---|---|---|---|---|---|---|---|---|---|---|
| 23 | 240° left | 0.90 μm | 0.42 μm | 0.42 μm | −10° | −80° | 30° | −30° | −60° | ◉ |
| 24 | 260° | 0.85 μm | 0.40 μm | 0.40 μm | 0° | 90° | 40° | −40° | −50° | ◉ |

TABLE 4-continued

| Examples | Twisting Angle T | $\Delta n \cdot d$ of liquid crystal | $\Delta nf \cdot df$ of phase difference plate 103a | $\Delta nf \cdot df$ of phase difference plate 103b | $\Theta_1$ | $\Theta_2$ | $\Theta_{103a}$ | $\Theta_{103b}$ | $\Theta_4$ | Contrast symmetry |
|---|---|---|---|---|---|---|---|---|---|---|
| | left | | | | | | | | | |

The equal-contrast curves of Examples 21 and 22 are symmetric with respect to the direction of the liquid crystal cell, and the display is easily viewed under these conditions.

From the Examples, it can be seen that improved viewing angle characteristics in the liquid crystal display device are obtained in accordance with the invention when the direction of the optical axis of the phase difference plate is angled to the observation direction, preferably between about 0°-30° or 60°-90°. This is true whether one or two phase difference plates are placed between the liquid crystal cell and the upper polarizing plate, or if one phase difference plate is placed between the liquid crystal cell and the upper polarizing plate and another between the liquid crystal cell and the lower polarizing plate. In this manner, a liquid crystal display device is obtained which has improved viewing angle characteristics as well as excellent black and white hues in the display.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A liquid crystal display device, comprising:
a twisted nematic liquid crystal display cell including a pair of spaced apart opposed substrates with electrodes selectively disposed thereon and a twisted nematic liquid crystal material disposed in the space between the substrates;
a pair of polarizing plates disposed on opposite sides of the liquid crystal cell, one of which defines a display screen; and
at least one layer of an optically anisotropic substance disposed between the liquid crystal cell and one of the pair of polarizing plates;
the display screen having a rear edge as viewed from a user and an observation direction which is both in the plane of the display screen and substantially perpendicular to the rear edge thereof, the observation direction being the direction of the projection in the plane of the display screen of the direction from which a user of said display device most frequently views said display screen, the device being constructed and arranged to have a viewing angle with respect to the observation direction at which the display will have acceptable contrast to accurately convey information to a user, the angle between the direction of the optical axis of the optically anisotropic substance layer and the observation direction of the display device being set at a predetermined angle to produce substantially bilateral symmetry of the contrast distribution with respect to the observation direction as the user moves in the direction of the viewing angle $\beta$ between a projection of the direction of viewing by the user in the plane of the display screen and the observation direction or in the direction of the viewing angle $\alpha$ between the direction of viewing of the user and an axis perpendicular to the observation direction and the plane of the display screen.

2. The liquid crystal display device of claim 1, wherein the liquid crystal material is twisted at least about 120°.

3. The liquid crystal display device of claim 1, wherein the predetermined angle is between one of about 0° and 30° and about 60° and 90°.

4. The liquid crystal display device of claim 3, wherein the optically anisotropic substance layer is made of a uniaxial high molecular weight polymers sheet.

5. The liquid crystal display device of claim 4, wherein the polymer sheet is a polymer selected from the group consisting of polycarbonate, diacetyl cellulose, polyamide, polyimide, polyether sulfone, polysulfone, polyolefin, polyethylene, polyethylene terephthalate, polyvinyl alcohol, acryl, and polymethyl methacrylate.

6. The liquid crystal display device of claim 5, wherein the polymer is polycarbonate.

7. The liquid crystal display device of claim 1, wherein the device includes at least two optically anisotropic layers of uniaxial high molecular weight polymer sheets disposed between the liquid crystal cell and one of the pair of polarizing plates, and wherein the predetermined angle between the direction of the optical axis of at least one of the sheets and the display device direction of observation is between one of about 0° and 30° and about 60° and 90°.

8. The liquid crystal display device of claim 1, wherein the device includes at least one optically anisotropic substance layer between the liquid crystal cell and one of the pair of polarizing plates and at least another optically anisotropic substance layer between the liquid crystal cell and the other polarizing plate, and the angle between the direction of the optical axis of at least one of the optically anisotropic substance layers and the display device direction of observation is between one of about 0° and 30° and about 60° and 90°.

9. The liquid crystal display device of claim 8, wherein the optically anisotropic substance layers are a uniaxial high molecular weight polymer.

10. The liquid crystal display device of claim 1, wherein the device includes at least one optically anisotropic substance layer between the liquid crystal cell and one of the pair of polarizing plates and at least another optically anisotropic substance layer between the liquid crystal cell and the other polarizing plate, and the angle between the bisector of the optical axes of the two optically anisotropic sheets adjacent to the liquid crystal cell and the display device direction of observation is between one of about 0° and 30° and about 60° and 90°.

11. The liquid crystal display device of claim 10, wherein each of the optically anisotropic substrate layers is a uniaxial high molecular weight polymer layer.

12. A liquid crystal display device having a display screen with a rear edge as viewed from a user, comprising:
- a super twisted nematic liquid crystal cell including first and second opposed electrode substrates with a twisted nematic liquid crystal material therebetween with an angle of twist between about 180° and 260° from the first substrate to the second, the cell having an observation direction, the observation direction being a direction of the projection in the plane of the display screen of the direction from which a user of said display device most frequently views said display screen, the observation direction being both in the plane of the display screen and substantially perpendicular to the rear edge thereof;
- a pair of polarizing plates disposed on opposite sides of the liquid crystal cell with $\Theta_1$ being the angle between the observation direction and the axis of polarization of the first polarizer adjacent the first substrate of the liquid crystal cell and $\Theta_2$ being the angle between the observation direction and the axis of polarization of the other polarizer; and
- at least one layer of an optically anisotropic material between the liquid crystal cell and one polarizer with $\Theta_3$ being the angle between the optical axis of the at least one layer of optically anisotropic material and the observation direction,
- $\Theta_3$ between one of about 0° and 30° and about 60° and 90°.

13. The liquid crystal display device of claim 12, wherein $\Theta_1$ is between about 15° and 75°.

14. The liquid crystal display device of claim 13, wherein $\Theta_2$ is between about 0° and 45°.

15. The liquid display device of claim 13, wherein the first substrate has a rubbing direction, and an angle $\Theta_4$ is defined between the observation direction and the rubbing direction of the first substrate and is between about 55° and 90°.

* * * * *